(12) United States Patent
Schopf

(10) Patent No.: US 8,274,169 B2
(45) Date of Patent: Sep. 25, 2012

(54) WIND POWERED GENERATOR FOR A VEHICLE

(76) Inventor: William K. Schopf, Whitehall, PA (US)

(*) Notice: Subject to any disclaimer, the term of this patent is extended or adjusted under 35 U.S.C. 154(b) by 581 days.

(21) Appl. No.: 12/617,761

(22) Filed: Nov. 13, 2009

(65) Prior Publication Data

US 2010/0127505 A1  May 27, 2010

Related U.S. Application Data

(60) Provisional application No. 61/135,397, filed on Nov. 25, 2008.

(51) Int. Cl.
*B60L 8/00* (2006.01)

(52) U.S. Cl. .............. 290/55; 322/35; 180/165

(58) Field of Classification Search .............. 290/55; 322/35; 180/165
See application file for complete search history.

(56) References Cited

U.S. PATENT DOCUMENTS

| | | | |
|---|---|---|---|
| 3,621,930 A | 11/1971 | Dutchak | |
| 3,718,614 A | 2/1973 | Smyth | |
| 4,141,425 A | 2/1979 | Treat | |
| 4,168,759 A | 9/1979 | Hull | |
| 4,362,469 A | 12/1982 | van Holten | |
| 4,423,368 A * | 12/1983 | Bussiere | 322/35 |
| 4,426,192 A | 1/1984 | Chertok et al. | |
| 4,571,157 A | 2/1986 | Eickmann | |
| 4,582,013 A | 4/1986 | Holland, Jr. | |
| 5,083,039 A | 1/1992 | Richardson et al. | |
| 5,280,827 A | 1/1994 | Taylor et al. | |
| 5,285,112 A | 2/1994 | Mann | |
| 5,287,004 A * | 2/1994 | Finley | 290/55 |
| 5,334,630 A | 8/1994 | Francis et al. | |
| 5,364,231 A * | 11/1994 | Eick et al. | 416/157 R |
| 5,407,477 A | 4/1995 | Reynolds et al. | |
| 5,606,233 A | 2/1997 | Davis | |
| 6,138,781 A | 10/2000 | Hakala | |
| 2011/0116927 A1 * | 5/2011 | Hancock et al. | 416/23 |

* cited by examiner

*Primary Examiner* — Truc Nguyen
(74) *Attorney, Agent, or Firm* — Harold I. Masteller

(57) ABSTRACT

The present invention is directed to wind powered apparatus for recharging batteries in an electric powered vehicle, the system includes at least one generator adapted to alternately recharge batteries that supply power to the vehicle, and at least one windmill with turbine blades that automatically adjust blade pitch and operate the generator. Each adjusting turbine blade includes at least one fluid handling system that contains a non-Newtonian pseudoplastic fluid, the handling system including means to reposition the non-Newtonian pseudoplastic fluid between a first location and a second location within the fluid handling system in response to a fluid viscosity is changed by shear created from blade rotation, the blade pitch changed by a shift in blade center of gravity from the repositioned fluid.

21 Claims, 4 Drawing Sheets

US 8,274,169 B2

WIND POWERED GENERATOR FOR A VEHICLE

CROSS REFERENCE TO RELATED APPLICATION(S)

This application claims priority from U.S. Provisional Application No. 61/45,397 filed on Nov. 25, 2008.

FIELD OF INVENTION

The present invention is directed to a wind-powered generating system that recharges batteries in electric powered vehicles by directly applying wind energy to a generator that provides electrical current to recharge batteries that operate vehicle such as an automobile, truck, boat, or the like

BACKGROUND

The present invention is in the technical field of onboard vehicle battery recharging. More particularly, the present invention is in the technical field of integrated wind driven devices that generate and maintain sufficient electrical power to operate a vehicle. The fluid viscosity changes to control turbine blade pitch or angle of attack to establish a constant and optimal rpm in turbine blade speed. Such variable viscosity fluids are non-Newtonian pseudoplastic fluids, the group of fluids comprising thixotropic fluids and shear thinning fluids. In the instance of thixotropic fluids, viscosity decreases over time at a constant shear rate. A shear thinning fluid exhibits decreasing viscosity with an increasing shear rate. In the present invention, rotation of the turbine blades produces shear that decreases the viscosity of the non-Newtonian pseudoplastic fluid, thereby decreasing its resistance to flow. The less viscid fluid is able to move along the turbine blade from a first position to second position that changes the center of gravity of the blade, which in turn, changes the angle of attack or blade pitch.

The present invention includes various improvements over past onboard wind-powered systems for generating electricity in a vehicle by directly applying wind energy for electrical conversion without additional heat, ductwork, multi-staged impellers, nozzles, or air compressors. These functional devices add excess weight to the devices of the past, reduce total work efficiency, increase complexity for mechanical maintenance, and reduce power generating efficiency.

The present invention changes turbine blade pitch or angle of attack for each windmill by modifying the blade center of gravity with respect to a central gear and lock pin device by using a non-Newtonian pseudoplastic fluid to achieve a constant and optimum rpm in turbine blade speed. This results in a more efficient battery charging as compared to onboard chargers of the past.

Conventional vehicle battery recharging devices, such as generators or alternators, require a direct connection to the vehicle's engine that turns the generator shaft via belts or chains. To enhance the overall efficiency of battery operated vehicles (but not limiting the use of the present invention to only electrical vehicles) a means is needed that will not increase friction (energy loss from the engine's torque) caused by such added belts or chains. By placing one or more windmill units, with internal non-Newtonian pseudoplastic fluids, at strategic locations on the vehicle that take advantage of incoming air, onboard batteries can be recharged and/or used during operation of the vehicle.

SUMMARY

Accordingly, it is a first object of the present invention to provide means to recharge onboard vehicle batteries by directing an incoming air flow against turbine blades on one or more windmills that turn a generator to produce an effective voltage output for recharging the batteries during operation of a vehicle.

It is another object of the present invention to change the pitch or angle of attack of each turbine blade in responsive to a change in blade center of gravity caused by a flow in a non-Newtonian pseudoplastic fluid from a first position to a last position along the turbine blade.

It is still another object of the present invention to change blade to an angle of attack that rotates the turbine blades at a constant rpm that develops an optimum electrical current from the generator.

It is another object of the present invention to reverse turbine blade rotation to cause a flow of the non-Newtonian pseudoplastic fluid flow back to the first position, the reversed rotation initiated in response to an absence of incoming air flow.

It is still another object of the present invention to provide means to switch batteries between a power mode that operates the vehicle and a charge mode that increases battery voltage.

In satisfaction of the foregoing objects and advantages, the present invention provides wind powered apparatus for recharging batteries in a moving electric powered vehicle. The wind powered apparatus includes at least one generator adapted to alternately recharge the batteries that supply power to the vehicle, and at least one windmill with adjustable pitch turbine blades that operate the generator, each turbine blade includes at least one fluid handling system containing a non-Newtonian pseudoplastic fluid that flows between a first position and a second position in the fluid handling system in response to a viscosity change in the fluid, the turbine blade pitch changed by the repositioned fluid.

BRIEF DESCRIPTION OF THE DRAWING(S)

DETAILED DESCRIPTION OF THE PREFERRED EMBODIMENT(S)

Figure 1:
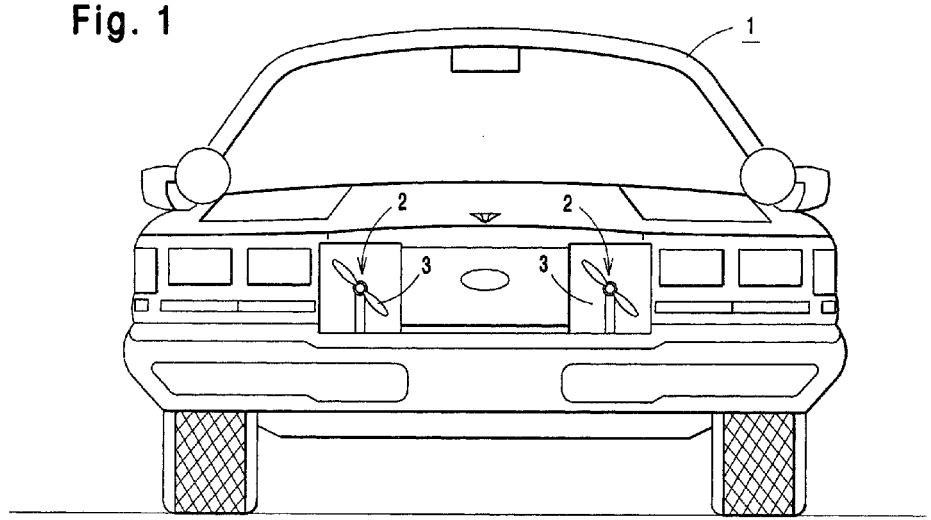
FIG. 1 is a front elevation view of a vehicle showing windmills positioned to receive an incoming air flow that rotates the turbine blades.
Figure 2:
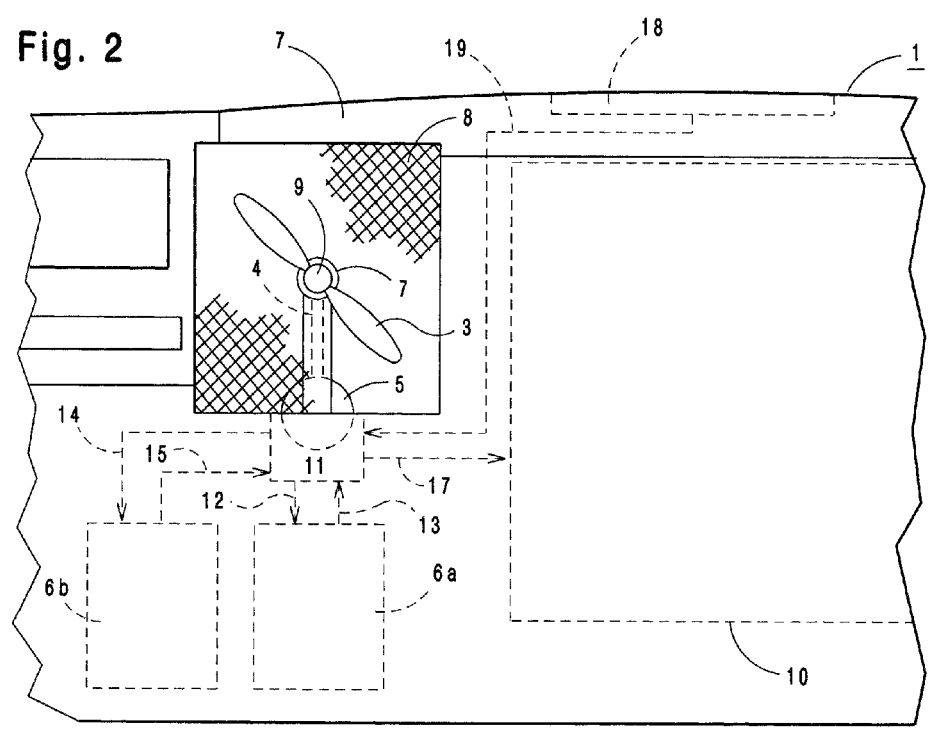
FIG. 2 is an enlarged view of a portion of FIG. 1.

Referring to FIGS. 1 and 2, the preferred embodiment of the present invention includes at least one wind powered generator system 2 with windmills 9 positioned within an electric powered vehicle 1 at a location that receives an uninterrupted incoming flow of air against adjustable pitch turbine blades 3 when vehicle 1 is in motion. A power train or linkage 4 (FIG. 2), for example a belt or other suitable device, connects the rotating turbine blades to a generator 5 that produces an effective electrical current (direct current, DC) capable of recharging an onboard array of batteries 6a while similar batteries 6b provides power to motor 10 that operates the vehicle. Although FIGS. 1 and 2 show placement of the wind powered generators along the front grill section of the electric powered vehicle 1, it should be understood that any suitable location on vehicle 1 may be used for placement of the windmills 9 to optimize performance and output from generator 5.

Referring in particular to the enlarged view in FIG. 2, showing one of the wind powered generator systems 2 located within the motor compartment 7 of vehicle 1, each device is positioned behind a protective grill or grid 8 that shields windmill 9 from dirt and road debris. An optional outside power source 7, such as a motor or an engagement/disengagement drive belt or chain mechanism, is provided to rotate the adjustable pitch turbine blades 3 in the opposite direction, for a limited period of time, when there is an absence of incoming air onto the turbine blades 3. The opposite direction rotation should be sufficient in time to enable the reduced viscosity fluid to return back to the main reservoirs as described below for FIGS. 3 and 5.

An electrical switch circuit 11 alternately brings batteries 6a-6b online or offline in response to monitored or sensed voltage levels in the batteries. For example, when battery 6a is offline, an electrical charge is received from generator 5 along line 12 to recharge battery 6a while battery 6b provides an electrical current to motor 10 along lines 15 and 17 controlled by the switch circuit 11. Likewise, when battery 6b is offline, an electrical charge is received from generator 5 along line 14 while battery 6a delivers electrical current to motor 10 along lines 13 and 17 via switch 11.

Adjustable pitch turbine blade angles are preferred in the art because they increase overall performance and energy efficiency as conditions and electrical demands change. The output force of each windmill in the system may be directed to a single generator or alternatively, the output force of multiple windmills may be combined (in parallel) to maximize power generation. The advantages of the present invention include, without limitation, an energy efficient means to recharge vehicle batteries using forced air from the motion of the car to rotate self-adjusting pitch angle turbine blades for electrical power generation.

The wind powered generating system can be used in combination with solar cells to provide both wind and solar power generation for use under both static and dynamic conditions of vehicle operation. Referring again to FIG. 2, a solar cell arrangement 18 is located on the vehicle at a position that provides maximum exposure to light energy from the sun to produce sufficient solar power for operating the vehicle. The electrical output from solar cell 18 is transmitted to switch circuit 11 along line 19 where the current can be used to either recharge batteries 6a-6b or directly run motor 10 that operates vehicle 1.

Such battery operated vehicles typically attain forward speeds of between 15-50 miles per hour during normal operation. Air flow generated from the forward vehicle speed, is directed into the turbine blades to operate generators capable continuously of producing 5-30 amps of current at 12-18 volts (direct current, DC) while the vehicle is in motion. Because the preferred embodiment in FIG. 2 comprises relatively small, lightweight windmills, (less weight per unit vehicle) fewer batteries may be required to provide sufficient energy for normal operation, as compared to state of the art onboard electric generating systems. Further, unlike solar cells, windmills can operate at night, in rain, snow or other weather conditions that would impede solar powered vehicles from operating.

In the present invention, the blade sections are designed to provide optimal surface area. The objective is to achieve an optimum constant speed for each windmill portion of the generator system. At a constant rpm, turbine blades can change blade pitch to take better advantage of the incoming wind in much the same way a multi-speed transmission takes advantage of its power source. Pitch mechanisms can vary, but the desired effect is to change the angle of attack of the turbine blade to take either a smaller "bite" or a larger "bite" of air as the blade rotates. In turbine blade driven aircraft, pitch adjustment is accomplished with mechanical gears and/or an electric motor. In the present invention, inside each turbine blade are one or more compartments that house a fluid handling system that contains a non-Newtonian pseudoplastic fluid that can move to different locations within the handling system when placed under stress, the shifted weight of the repositioned fluid causing a change in blade pitch. Wind impacting on the turbine blades causes the stress when it rotates the turbine blades. The optimum blade pitch angle is maintained with a lock-gear mechanism relative to a defined center of gravity. When the vehicle stops, there is an absence of wind or air flow, and the fluid can return to its original position within the handling system by briefly reversing the rotation of the turbine blades as mentioned above.

The non-Newtonian pseudoplastic fluid contained within the fluid handling system is selected from the group comprising thixotropic fluids and shear thinning fluids. It should be noted that during testing with the apparatus shown in FIG. 5, a thixotropic fluid was used to demonstrate feasibility of the present invention; therefore, the following description will refer to thixotropic fluids with the understanding that the scope of the invention includes all non-Newtonian pseudoplastic fluids.

Figure 3:
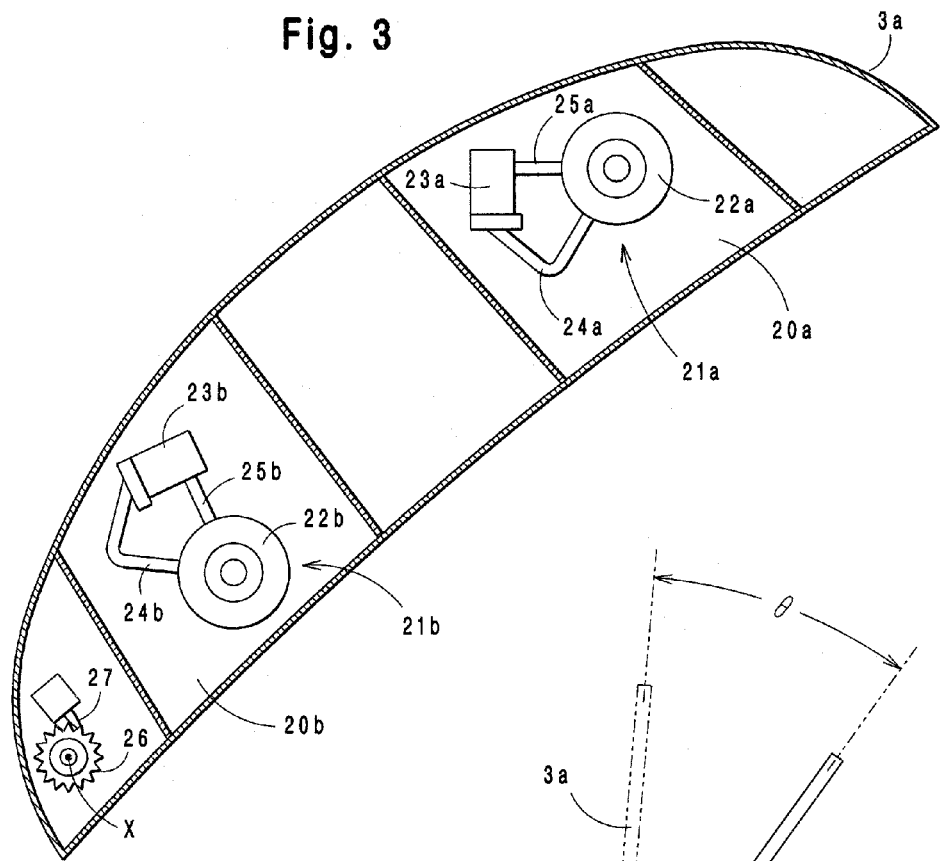
FIG. 3 is a schematic cross-section view of an adjustable pitch turbine blade.
Figure 4:
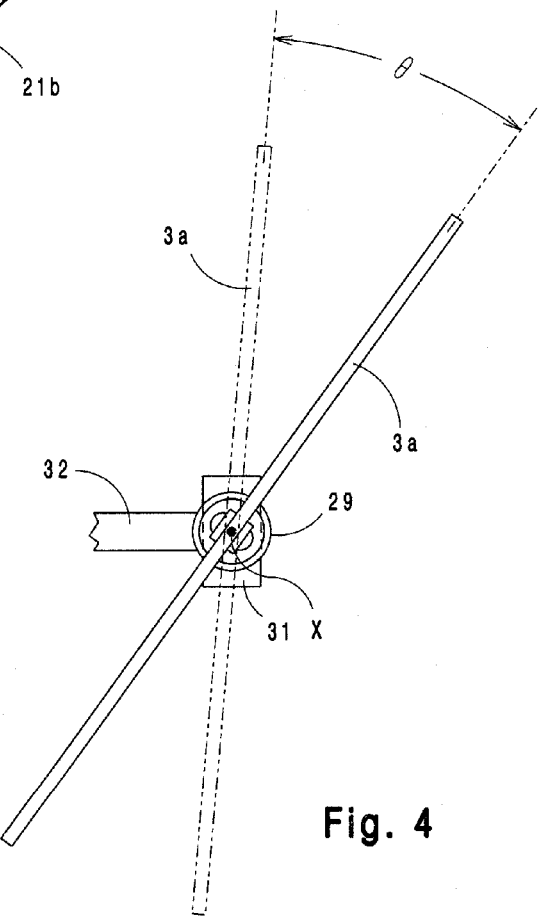
FIG. 4 is an elevation view showing turbine blade pitch adjustment.

Referring to the schematic view of the turbine blade 3a in FIG. 3, each turbine blade comprises one or more interior compartments or chambers, in this instance, chambers 20a and 20b that house a fluid handling system 21a and 21b respectively. Each fluid handling system includes a first or main reservoir 22a and 22b and a second or withdrawal reservoir 23a and 23b. Each main reservoir 22a-22b contains a thixotropic fluid having a viscosity that prevents fluid flow between the main reservoirs and the withdrawal reservoirs. Drain tubes or conduits 24a and 24b extend between and communicate with the main and withdrawal reservoirs 22a-22b and 23a-23b respectively to provide a passage between the reservoirs. Similarly, return tubes or conduits 25a and 25b extend between and communicate with the main and withdrawal reservoirs. Turbine blades 3a are connected with bearing 29 (FIG. 4), or a like device, to a hub 31 on shaft 32 so that the blades 3a can rotate within a blade pitch range and adjust blade pitch. The opposite end of shaft 32 is fixed to the generator armature or rotor in generator 34. Alternately, the blades can be adapted to indirectly drive the rotor through a power train, for example, a belt, chain, or gears. The rotatable connection enables adjustment in turbine blade pitch about an axis of rotation "X", the adjusted turbine blade providing an adjustable angle of attack Θ between a smallest and largest bite of air as the turbine blade rotates. In addition, referring again to FIG. 3, the rotatable connection 29 includes a ratchet 26 and pawl 27 mechanism to restrain and/or control blade pitch angle as pitch adjusts in response to changes in center of gravity caused by the flow of thixotropic fluid within the fluid handling systems 21a-21b.

The thixotropic fluid flow occurs in response to shear produced by the rotating turbine blades. As heretofore described above, shear, over time, reduces the viscosity in a thixotropic fluid. The reduced viscosity or thinner fluid is able to flow between reservoirs 22a-22b and 23a-23b through drain tubes 24a-24b and return tubes 25a-25b. The shifted weight of repositioned fluid changes blade center of gravity and rotates blade 3a about axis "X" to a different pitch within a pitch angle range Θ.

Figure 5:
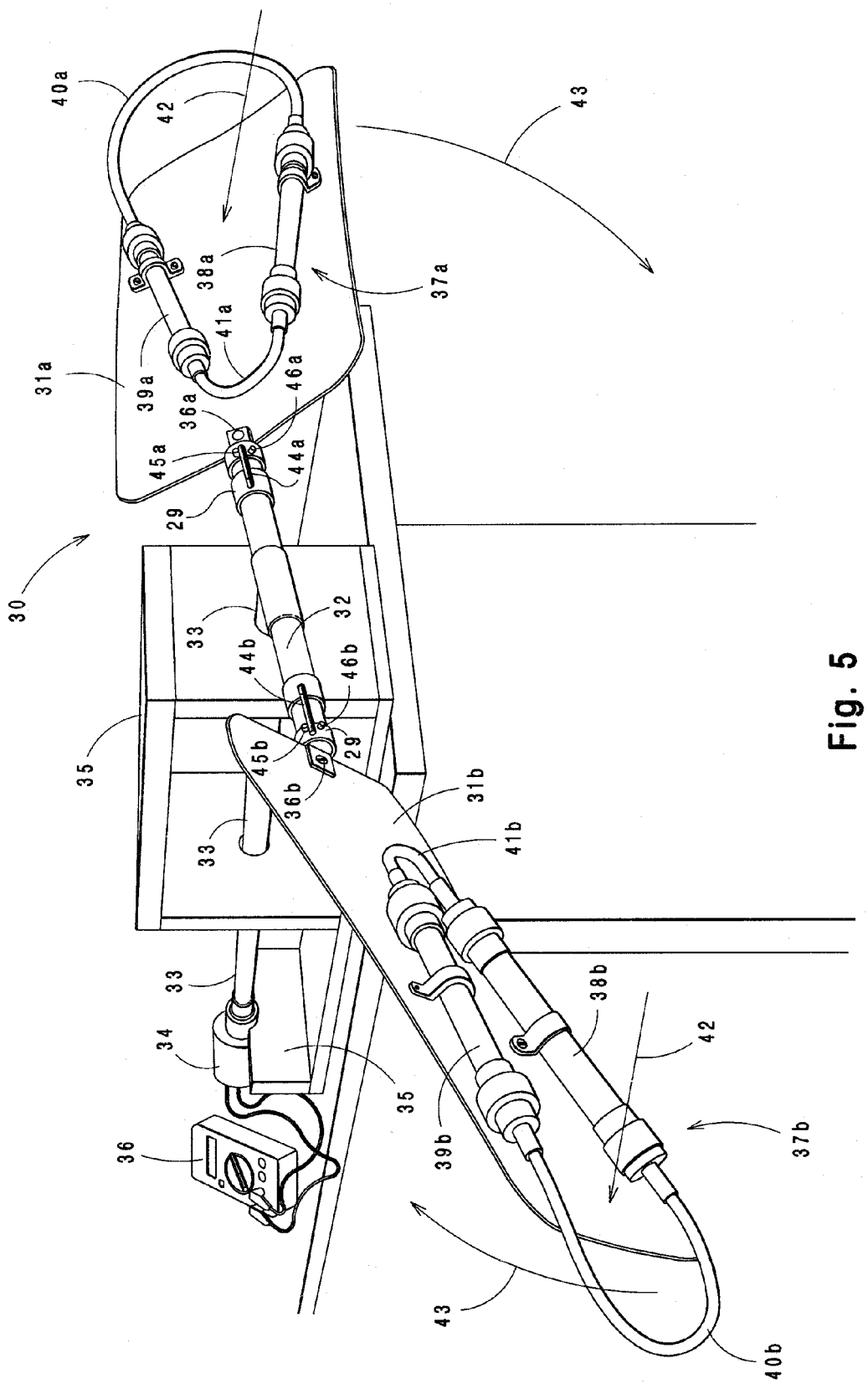
FIG. 5 is a perspective view of test apparatus to measure voltage output in response to changes in turbine blade pitch.
Figure 6:
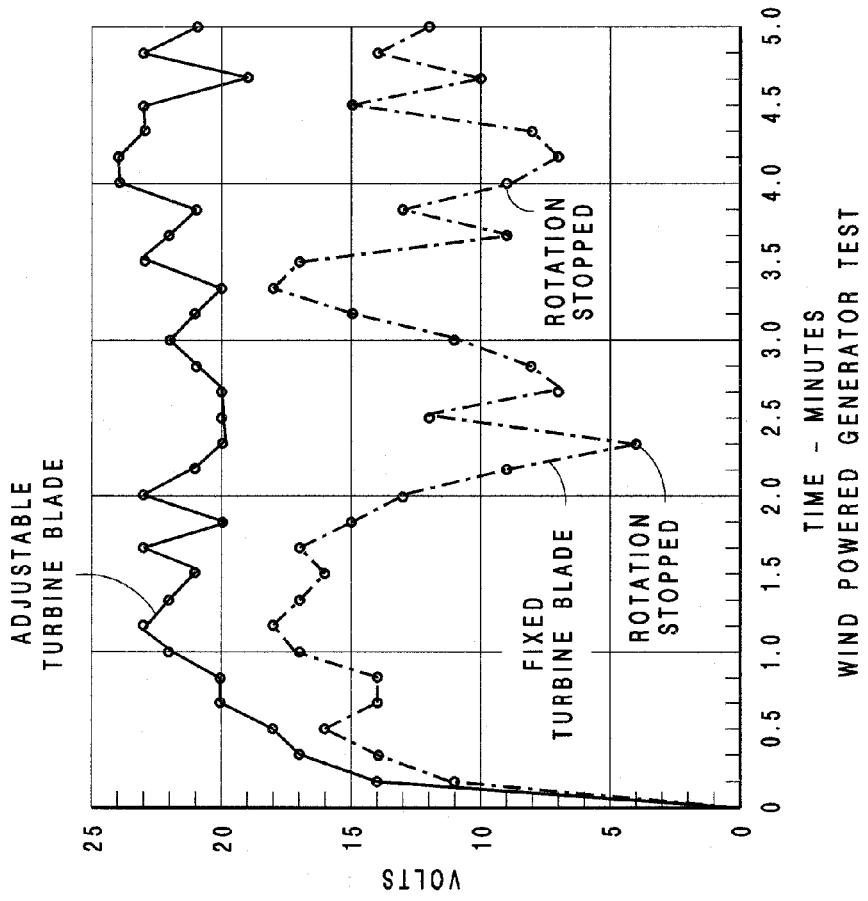
FIG. 6 is a graph showing voltage output using the test apparatus in FIG. 5.

The present invention was tested with the apparatus 30 in FIG. 5. Because of cost considerations, the test apparatus does not include the preferred interior fluid handling system. The inventor attached his fluid handling systems to the upwind surface or side of the turbine blades. Such surface attachment adversely affects the aerodynamics of the test apparatus blades. In addition, the various rotating constituent elements of the assembly lack low friction bearings that would make the unit run more efficiently. However, in spite of such limitations, it was possible to clearly demonstrate that his turbine blade, that automatically adjusts blade pitch in response to a thixotropic fluid flow, provides an improved voltage output when compared to a single pitch turbine blade as shown by the plotted test data in FIG. 6.

Test apparatus 30 includes adjustable pitch turbine blades 31a and 31b rotatably attached to an arm 32 fixed to one end of shaft 33 that rotates an armature in generator 34. The apparatus also includes structure 35 that supports generator 34 and rotating shaft 33 attached the generator armature. A voltmeter 36 is provided to monitor electrical output from generator 34.

Each turbine blade 31a-31b includes a fluid handling system 37a and 37b attached to the upwind surface or side of their respective turbine blades, and each fluid handling system 37a-37b includes a first or main reservoir 38a and 38b and a second or withdrawal reservoir 39a and 39b respectively. As earlier described, drain tubes 40a and 40b and return tubes 41a and 41b extend between and communicate with the main reservoir and withdrawal reservoir. A fan (not shown) is positioned to direct a flow of air into the turbine blades 31a-31b as indicated by the wind direction arrows 42. In response to the incoming air flow, the turbine blades rotate in a clockwise direction as indicated by direction arrow 43.

Each main reservoir 38a-38b contains a thixotropic fluid comprising about 85% light oil and about 15% clay by weight. The clay used in the test mixture was manufactured by Southern Clay Products, Inc., Gonzales, Tex., and it is sold under the name CLAYTONE® HY. The clay product comprises between 1% and 3% quartz and between 95% and 99% quaternary ammonium compounds. Although not required for the test, during actual use, the non-Newtonian pseudoplastic fluid should have a freezing point <10° C. and a boiling point >100° C. to enable turbine blade pitch adjustment under extreme weather conditions. It should also be understood that the above tested thixotropic fluid is not intended to be limiting in scope and that any non-Newtonian pseudoplastic fluid may be used to rotate the turbine blades without departing from the scope of the present invention.

When the fan is operated to direct a flow of air into the turbine blades, the rotating blades produce a shear force that causes a viscosity reduction in the thixotropic fluid contained in the main reservoirs. The lower viscosity, in combination with centrifugal force from blade rotation, causes the thinner fluid to flow from the main reservoirs 38a-38b through drain tubes 40a-40b and into the withdrawal reservoirs 39a-39b. The flows of fluid from the main reservoirs to the withdrawal reservoirs shifts the blade center of gravity which in turn causes the turbine blades 31a-31b to rotate about bearings 29 and connections 36a-36b, and automatically adjust the turbine blades to an optimal pitch less than the 41° starting pitch. Arm 32 includes a pitch control arms 44a and 44b that engage detents 45a-46a and 45b and 46b respectively to establish the blade pitch range Θ shown in FIG. 4. Under certain conditions and different turbine designs, the blade pitch range will be different from the test apparatus. It should be understood that any adjustable blade pitch range used with different turbine blade designs fall within the scope of the present invention.

Because the drain tubes and return tubes in the test apparatus 30 are made from transparent plastic tubing, when the fan was turned off and rotation of the turbine blades 31a-31b discontinued, it was observed that the thinner thixotropic fluid slowly flowed from the withdrawal reservoirs 39a-39b, through return tubes 41a-41b, and back into the main reservoirs 38a-38b until the absence of shear caused an increase in fluid viscosity. With the increase in viscosity, fluid flow stopped. Such slow fluid return or recovery may be suitable under certain applications of the present invention. However, in the preferred embodiment, where the turbine blades recharge electric vehicle batteries, rapid recovery to the main reservoirs is necessary to meet changing traffic conditions that cause the vehicle to repeatedly start and stop. Referring again to FIG. 2, the outside power source 7 meets such a need by reversing the direction of turbine blade rotation so that fluid recovery is relatively quick when the vehicle is brought to a stop.

During testing, the apparatus was operated with both a fixed 41° blade angle and the adjustable pitch blade with a variable blade angle range Θ≦41°. The electrical output from generator 34 was indicated on voltmeter 36 and the output was recorded every ten seconds for a test period of five minutes. The raw data is plotted in FIG. 6 for both the fixed pitch angle blade and the adjustable pitch angle blade. The following Table 1 shows electrical output (volts), in averaged thirty second increments over the five minute test. During testing, it was observed that the fixed angle test, where the blade pitch was set at the fixed 41° angle, rotation of the turbine blades was problematic with blade rotation periodically stopping during the test. This problem did not occur in the adjustable blade test. The adjustable turbine blades rotated continuously as the blade pitch automatically changed with the fluid flow, increasing the rpm in the generator, and improving electrical output as indicated by the voltmeter and recorded below.

TABLE 1

| FIXED 41° BLADE PITCH ANGLE | | ADJUSTABLE BLADE PITCH ANGLE ≦41° | |
| --- | --- | --- | --- |
| Time - Minutes | Volts | Time - Minutes | Volts |
| 0 to 0.5 | 13.7 | 0 to 0.5 | 16.3 |
| 0.5 to 1.0 | 15 | 0.5 to 1.0 | 20.7 |
| 1.0 to 1.5 | 17 | 1.0 to 1.5 | 22.0 |
| 1.5 to 2.0 | 15 | 1.5 to 2.0 | 22.0 |
| 2.0 to 2.5 | 8.3* | 2.0 to 2.5 | 20.3 |
| 2.5 to 3.0 | 8.7 | 2.5 to 3.0 | 21.0 |
| 3.0 to 3.5 | 16.7 | 3.0 to 3.5 | 21.3 |
| 3.5 to 4.0 | 10.3* | 3.5 to 4.0 | 22.3 |
| 4.0 to 4.5 | 10* | 4.0 to 4.5 | 23.3 |
| 4.5 to 5.0 | 12 | 4.5 to 5.0 | 21.0 |

*Rotation Stopped

As shown in Table 1, the fixed pitch turbine blade generated an average electrical output of 12.7 volts over the five minute test, while the adjustable pitch turbine blade generated an average electrical output of 21.0 volts over the five minute test. This is a significant 65.4% improvement in electrical output using the present invention as compared to a fixed blade generating system, and it is believed that the voltage output could be further improved with a more aerodynamically designed turbine blade and low friction bearings.

Figure 7:
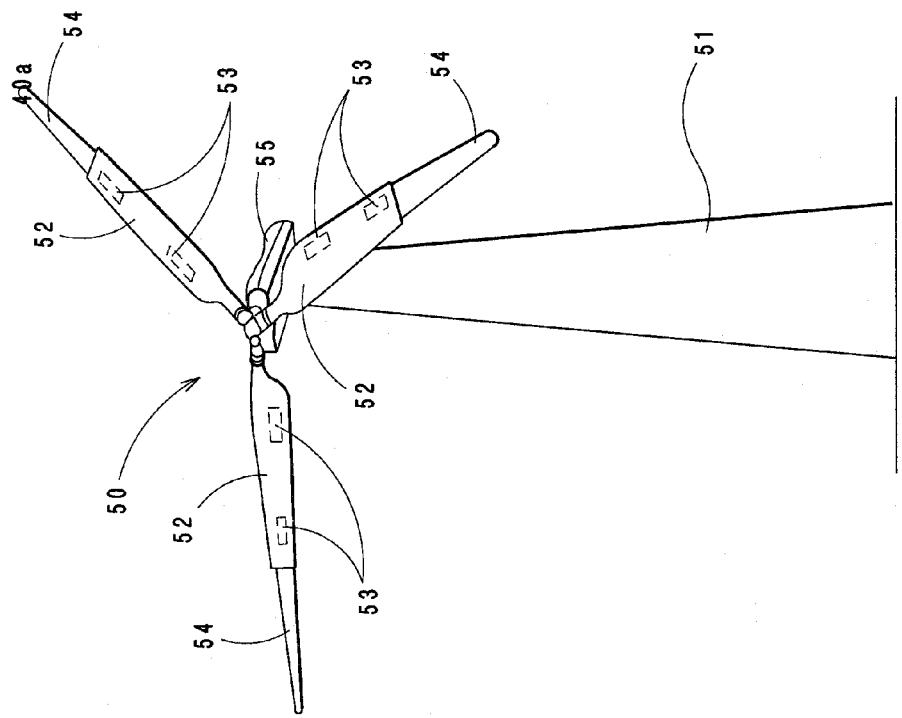
FIG. 7 is an alternate windmill embodiment of the present invention.

Although the preferred embodiment of the present invention is directed to recharging batteries in an electric powered vehicle, the present wind powered generator may be used in other or different power generating applications without departing from the scope of the present invention. For example, referring to FIG. 7, the drawing shows one type of wind powered generator or windmill 50 typically used to generate electrical current for the power industry. The windmill comprises a tower 51 that supports at least two turbine blades 52 that house internal thixotropic fluid handling systems 53 as disclosed above in the preferred embodiment. In some instances, additional blade sections 54 are added to provide increased surface area. The additional blade sections may include an optional internal thixotropic handling system. The turbine blades 52 are connected to a generator 55 and the internal fluid handling systems 53 controls the angle of attack for each respective blade so that the turbine blades rotate at an optimum constant speed that more efficiently generates electrical energy to an electrical power grid in the power industry.

In the various above described embodiments, the turbine blades may be made of metal or other sufficiently rigid and strong material such as high-strength plastic, synthetic polymers, carbon fiber, or wood. The electrical power generators are selected for high operating efficiency, they are lightweight, and are designed for a long service life.

As such, an invention has been disclosed in terms of preferred embodiments and alternate embodiments thereof, which fulfills each one of the objects of the present invention as set forth above and provides a wind powered generator system for recharging electric powered vehicle batteries or for other applications. Of course, various changes, modifications, and alterations from the teachings of the present invention may be contemplated by those skilled in the art without departing from the intended spirit and scope thereof. It is intended that the present invention only be limited by the terms of the appended claims.

The invention claimed is:

1. A wind powered generating system for recharging batteries in a moving electric powered vehicle, comprising;
   a) at least one generator that alternately recharges batteries that provide power to operate the vehicle;
   b) at least one windmill having adjustable pitch turbine blades that operate said at least one generator through linkage means when said adjustable pitch turbine blades are rotated by incoming air from the moving vehicle, each adjustable pitch turbine blade fixed to a bearing that rotates the blade within a blade pitch range, each adjustable pitch turbine blade including at least one fluid handling system comprising,
      i) a first reservoir,
      ii) a second reservoir,
      iii) a drain tube extending between and communicating with said first reservoir and said second reservoir,
      iv) a return tube extending between and communicating with said first reservoir and said second reservoir; and
   c) a fluid selected from the group consisting of thixotropic fluids and shear thinning fluids, said fluid contained within said at least one fluid handling system.

2. The wind powered generating system recited in claim 1, whereby: said fluid has a first viscosity in the absence of turbine blade rotation and a second reduced viscosity in the presence of turbine blade rotation, the reduced viscosity fluid repositioned by said turbine blade rotation from said first reservoir, through said drain tube, and into said second reservoir so that the repositioned reduced viscosity fluid shifts turbine blade center of gravity and causes said bearing and respective turbine blade to rotate within said blade pitch range.

3. The wind powered generating system recited in claim 1, comprising: a switch circuit that alternately brings batteries online to operate the vehicle or offline to charge batteries with said wind powered generating system in response to a sensor output signal indicative of battery voltage levels.

4. The wind powered generating system recited in claim 1, comprising: a power source that reverses turbine blade rotation in response to an absence of the incoming air, the reduced viscosity fluid repositioned by said reversed turbine blade rotation from said second reservoir, through said return tube, and into said first reservoir so that the repositioned reduced viscosity fluid shifts turbine blade center of gravity and causes said bearing and respective turbine blade to rotate within said blade pitch range.

5. The wind powered generating system recited in claim 3, comprising: solar cells that provide a combination of wind and solar power for vehicle operation, electrical current from the solar cells selectively operating the vehicle or charging the batteries through the switch circuit.

6. A wind powered apparatus for recharging batteries in an electric powered vehicle, comprising:
   a) at least one generator adapted to alternately recharge the batteries;
   b) at least one windmill with turbine blades that automatically adjust blade pitch and operate said at least one generator through a linkage mechanism; and
   c) at least one fluid handling system housed within each of the turbine blades, said at least one fluid handling system having a non-Newtonian pseudoplastic fluid contained therein and including means to reposition said non-Newtonian pseudoplastic fluid between a first position and a second position within said at least one fluid handling system after its viscosity is reduced by shear created from turbine blade rotation so that center of gravity is shifted in each turbine blade, each turbine blade pitch automatically adjusted in response to said shifted center of gravity.

7. The wind powered apparatus recited in claim 6, whereby said non-Newtonian pseudoplastic fluid is thixotropic.

8. The wind powered apparatus recited in claim 6, whereby said non-Newtonian pseudoplastic fluid is shear thinning.

9. The wind powered apparatus recited in claim 6, comprising: a switch circuit that alternately brings batteries online to operate the vehicle or offline to charge batteries with said wind powered apparatus in response to a sensor output signal indicative of battery voltage levels.

10. The wind powered apparatus recited in claim 6, comprising: a power source that reverses turbine blade rotation in response to an absence of incoming air.

11. A wind powered electrical generator, comprising: a windmill with automatic pitch adjusted turbine blades, each said turbine blade including at least one fluid handling system that contains a non-Newtonian pseudoplastic fluid, the fluid handling system including means to reposition or not reposition the fluid between a first position and a second position onboard said turbine blade in response to a viscosity change in the non-Newtonian pseudoplastic fluid, the viscosity change caused by either turbine blade rotation or absence of turbine blade rotation, the pitch of each turbine blade automatically adjusted in response to a shift in blade center of gravity caused by the repositioned non-Newtonian pseudoplastic fluid.

12. The wind powered electrical generator recited in claim 11, comprising: a generated electrical current for use in an electrical electric powered vehicle.

13. The wind powered electrical generator recited in claim 11, comprising: a generated electrical current for use in an electric power grid.

14. The wind powered electrical generator recited in claim 12, comprising: batteries and a switch circuit that alternately directs the generated electrical current to a battery selected in response to a sensor output signal indicative of a battery voltage level.

15. The wind powered electrical generator recited in claim 12, comprising: an outside power source that reverses turbine blade rotation in response to an absence of wind generated turbine blade rotation.

16. A method for recharging batteries in an electric powered vehicle, comprising:
    positioning a windmill with adjustable pitch turbine blades at a location on the vehicle that receives an incoming air flow when the vehicle is moving, each adjustable pitch turbine blade having an integral fluid handling system with means to reposition a non-Newtonian pseudoplastic fluid between a first location and a second location onboard the turbine blade;
    rotating the adjustable pitch turbine blades in response to the incoming air flow, the rotating turbine blades operating a generator to provide an electrical current for recharging the batteries, each rotating adjustable pitch turbine blade creating shear that reduces viscosity of the non-Newtonian pseudoplastic fluid; and
    shifting center of gravity in each adjustable pitch turbine blade in response to said reduced viscosity fluid flowing from said first location to said second location onboard each turbine blade, said shifted center of gravity causing each turbine blade to adjust pitch.

17. The method recited in claim 16, whereby said adjusted pitch is >1° and <41°.

18. The method recited in claim 16, whereby said non-Newtonian pseudoplastic fluid is thixotropic.

19. The method recited in claim 16, whereby said non-Newtonian pseudoplastic fluid is shear thinning.

20. The method recited in claim 16, further comprising: rotating the adjustable pitch turbine blades in a reversed direction in response to an absence of the incoming flow of air, said reversed rotation shifting center of gravity of each adjustable pitch turbine blade in response to said reduced viscosity fluid flowing from said second location to said first location onboard each turbine blade, said shifted center of gravity causing each turbine blade to adjust pitch.

21. The method recited in claim 20, whereby said adjusted pitch is >1° and ≦41°.

* * * * *